(12) United States Patent
Cappello

(10) Patent No.: US 8,695,323 B2
(45) Date of Patent: Apr. 15, 2014

(54) PLANT FOR THE GASIFICATION OF BIOMASS

(75) Inventor: Giovanni Cappello, Lecco (IT)

(73) Assignee: A.G.T. SRL (IT)

(*) Notice: Subject to any disclaimer, the term of this patent is extended or adjusted under 35 U.S.C. 154(b) by 1243 days.

(21) Appl. No.: 12/526,122

(22) PCT Filed: Feb. 6, 2008

(86) PCT No.: PCT/IT2008/000073
§ 371 (c)(1),
(2), (4) Date: Sep. 19, 2009

(87) PCT Pub. No.: WO2008/096387
PCT Pub. Date: Aug. 14, 2008

(65) Prior Publication Data
US 2010/0000224 A1 Jan. 7, 2010

(30) Foreign Application Priority Data

Feb. 7, 2007 (WO) .................. PCT/IT2007/000078

(51) Int. Cl.
*F02C 3/26* (2006.01)

(52) U.S. Cl.
USPC .................. 60/39.464; 60/39.465; 60/39.461; 60/39.463; 60/39.462; 60/39.47; 60/780; 60/781; 60/39.12

(58) Field of Classification Search
USPC ............... 60/39.464, 39.465, 39.461–39.463, 60/39.47, 781, 780, 39.12
See application file for complete search history.

(56) References Cited

U.S. PATENT DOCUMENTS

| 3,702,039 | A | | 11/1972 | Stookey et al. |
| 4,052,173 | A | | 10/1977 | Schulz |
| 4,154,582 | A | | 5/1979 | Woodmansee |
| 4,291,636 | A | * | 9/1981 | Bergsten et al. ............... 110/346 |
| 5,375,408 | A | * | 12/1994 | Daman .......................... 60/781 |

(Continued)

FOREIGN PATENT DOCUMENTS

| CN | 2680671 Y | 2/2005 |
| DE | 20000661 U1 | 4/2000 |

(Continued)

OTHER PUBLICATIONS

"PCT Partial International Search Report, from which the instant application is based," 5 pgs.

(Continued)

*Primary Examiner* — Gerald L Sung
*Assistant Examiner* — Craig Kim
(74) *Attorney, Agent, or Firm* — Fredrickson & Byron, P.A.

(57) ABSTRACT

A plant (100) for the gasification of biomass comprises a gasifier (10) and an apparatus (23) for the filtration of the gas. The apparatus comprises a scrubber (31), a tank (41), and a wet electrostatic precipitator (51). The scrubber is in fluid communication with the gasifier and with the tank, and is adapted for the injection of a washing liquid in the gas flow. The tank comprises a bottom area for collecting the liquid and a top area for holding the gas. The wet electrostatic precipitator is in fluid communication with the top area of the tank. In some examples, a gasifier comprises a gasification reactor (12), a grate (125) for the support of the biomass in the reactor (12) and a plug (126). The plug is vertically movable so as to close and/or open the middle part of the grate.

30 Claims, 14 Drawing Sheets

(56) References Cited

U.S. PATENT DOCUMENTS

| | | | | |
|---|---|---|---|---|
| 2001/0020417 | A1* | 9/2001 | Liu et al. .......................... | 96/66 |
| 2002/0069798 | A1* | 6/2002 | Aguadas Ellis ............... | 110/229 |
| 2003/0083391 | A1* | 5/2003 | Jahnke et al. ................. | 518/703 |
| 2003/0182944 | A1* | 10/2003 | Hoffman et al. ................ | 60/772 |

FOREIGN PATENT DOCUMENTS

| | | | |
|---|---|---|---|
| DE | 19916931 | A1 | 10/2000 |
| FR | 904352 | A | 11/1945 |
| FR | 2075023 | A5 | 10/1971 |
| FR | 2317965 | A1 | 2/1977 |
| GB | 177236 | A | 3/1922 |
| GB | 258348 | A | 9/1926 |
| GB | 326246 | A | 3/1930 |
| WO | 2005047435 | A | 5/2005 |
| WO | 2006021017 | A | 3/2006 |
| WO | 2009020442 | A1 | 2/2009 |

OTHER PUBLICATIONS

"PCT International Search Report dated Dec. 19, 2007, from which the instant application claims priority," 5 pgs.

"PCT International Search Report dated Aug. 14, 2009 for PCT/IT2008/000073, from which the instant application is based," 7 pgs.

"PCT Written Opinion dated Aug. 14, 2009 for PCT/IT2008/000073, from which the instant application is based," 10 pgs.

"PCT International Preliminary Report on Patentability dated Sep. 1, 2009 for PCT/IT2008/000073, from which the instant application is based," 11 pgs.

* cited by examiner

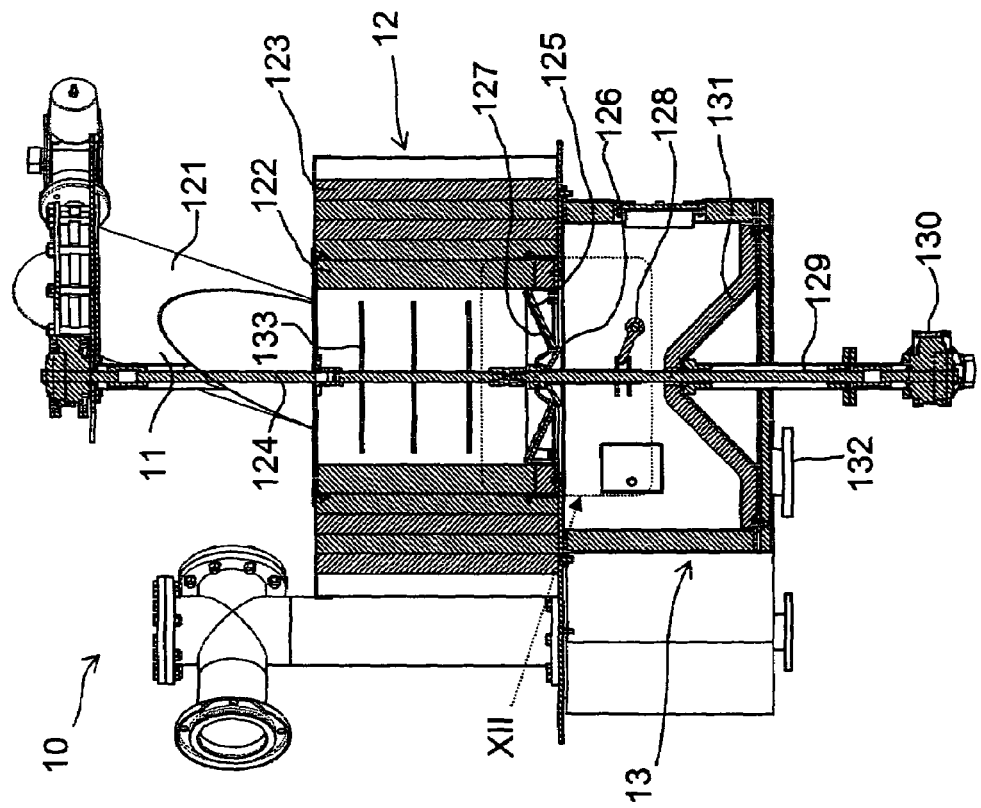
Fig. 2.2
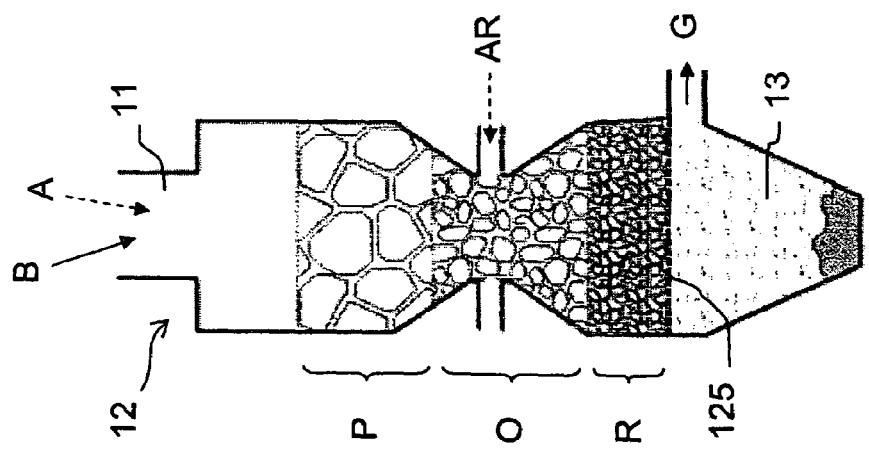
Fig. 2.1

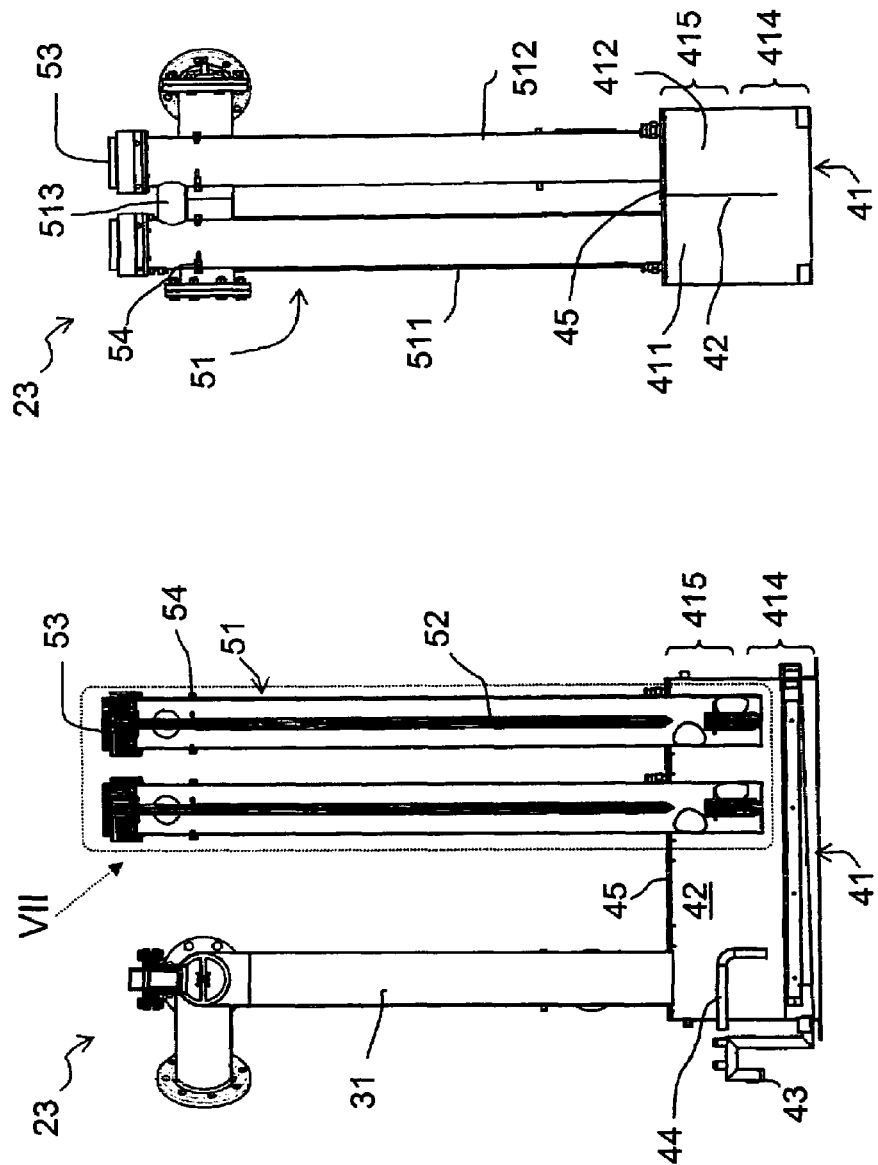

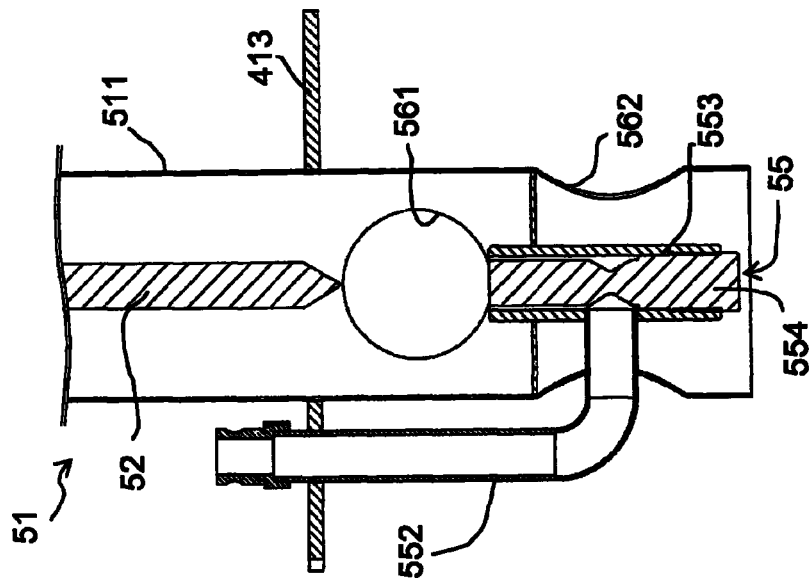
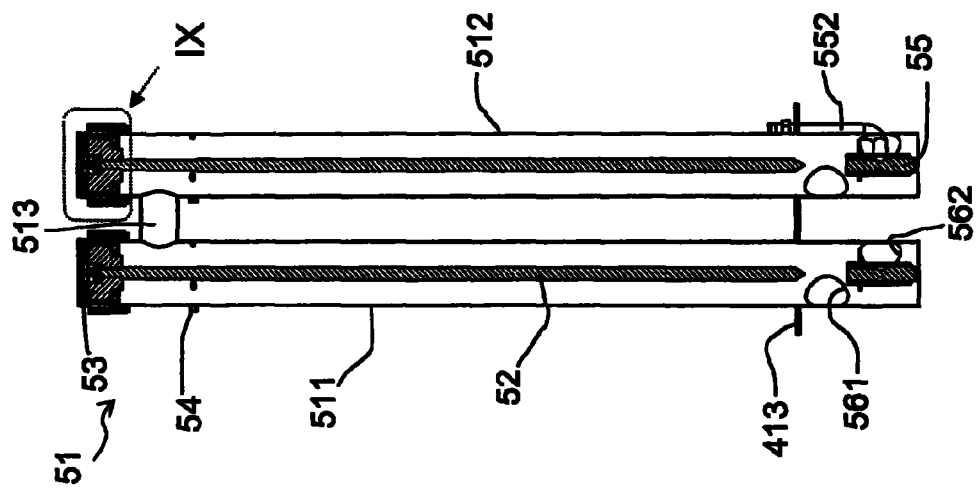

PLANT FOR THE GASIFICATION OF BIOMASS

RELATED APPLICATIONS

This application is a 35 U.S.C. 371 national stage filing from International Application No. PCT/IT2008/000073 filed Feb. 6, 2008 which claims priority to International Application No. PCT/IT2007/00078 filed Feb. 7, 2007 the teachings of which are incorporated herein by reference.

The object of the present invention is a gasification plant, particularly a gasifier and the filtration apparatus thereof. The gasifier is adapted for producing fuel gas from biomasses of different origin. The filtration apparatus is adapted for purifying the fuel gas produced by the gasifier.

Plants for the gasification of biomasses, i.e. plants adapted for producing fuel gas starting from biomasses have been long known. The most relevant fraction of the biomass (80-98%) is composed of carbon (C), hydrogen (H) and oxygen (OR) organized in different kinds of molecules. The remaining fraction of biomass (2-20%) is composed of other molecules and other inorganic elements, mainly silicon (Si), potassium (K), calcium (Ca), magnesium (Mg).

In a manner known per se, the main reactions which occur during gasification are:

$C+O_2 \rightarrow CO_2$ (Combustion)

$C+\frac{1}{2}O_2 \rightarrow CO$ (Partial oxidation)

$C+H_2O(g) \rightarrow CO+H_2$ (Reforming of the coal)

$C+CO_2 \rightarrow 2CO$ (Boudouard reaction)

$C+2H_2 \rightarrow CH_4$ (Methanation)

$CO+H_2O_{(g)} \rightarrow CO_2+H_2$ (Water/Gas Shift Reaction).

From these reactions, in the presence of air, a gas (called the 'producer gas') is achieved, which is composed of a mixture consisting approximately of 50% $N_2$, 20% CO, 15% $H_2$, 10% $CO_2$ and 5% $CH_4$. If the reactions occur in absence of air, the end mixture does not contain $N_2$ and takes the name of "synthesis gas" or Syngas.

Various types of gasification plants are known, which differ on the basis of the reactor structure, pathway that the gas runs within the reactor, kind of filtration apparatus employed, etc.

The gasification plants of a known type, however, are not without drawbacks.

Current gasification plants can be grouped into two main categories. The plants of the first category are mostly built with experimental aims, are characterized by having large dimensions (powers typically above 1 MegaWatt) and employ advanced technologies. These dimensions and the fact that they are generally built in unique exemplars make in effect their commercialization impossible in the large scale.

The plants of the second category are characterized by having small dimensions, they employ rudimental technologies and are mainly adapted for the rural contexts of developing countries. The technological backwardness of these plants makes in effect their employment in large scale impossible on the western energy market.

In the forties of the XX century, extremely compact gasification plants have been built. They were generally mounted on motor vehicles to compensate for the absence of petroleum-derived products. In fact, they allowed to feed the internal combustion engines with wood or charcoal. These plants were characterized by having small dimensions, but they had a poor efficiency and produced a gas of unacceptable quality for the current standards.

Furthermore, the vegetal biomass normally available for the feeding of the gasifiers is often contaminated by foreign heat-resistant inorganic bodies such as stones, scarp metals, etc. The build-up of such foreign bodies involves, in the gasification reactors of a known type, the clogging of the grate from which the gas is subject to suction. The maintenance operation for the removal of the foreign bodies and the resolution of the clogging requires a downtime, in the gasifiers of a known type.

Therefore, the object of the present invention is to provide a gasification plant adapted for overcoming at least partially the drawbacks observed with reference to the prior art.

Particularly, a task of the present invention is to provide a gasification plant with limited overall dimensions and able to produce a fuel gas with a filtration degree sufficient to be used also in the current and advanced internal combustion engines.

Furthermore, a task of the present invention is to provide a gasification plant able to ensure a continuous working also in the presence of foreign bodies within the feeding biomass.

This object and these tasks are achieved by a gasification plant according to claim 1 and through a gasifier according to claim 46.

In order to better understand the invention and appreciate its advantages, some of its exemplary, non-limiting embodiments are described herein below, with reference to the attached drawings, in which:

FIG. 1 is a schematic view of the plant according to the invention in the whole;

FIG. 2.1 is a sectional schematic view of a downdraft gasifier of a known type;

FIG. 2.2 is a sectional view of the gasifier according to the invention;

FIG. 5 is a view of the section taken along the line V-V of FIG. 4;

FIG. 6 is a view of the section taken along the line VI-VI of FIG. 4;

FIG. 7 is a view of the detail designed with VII in FIG. 5;

FIG. 8 is a detailed view of the section taken along the line VIII-VIII in FIG. 4;

Figure 1:
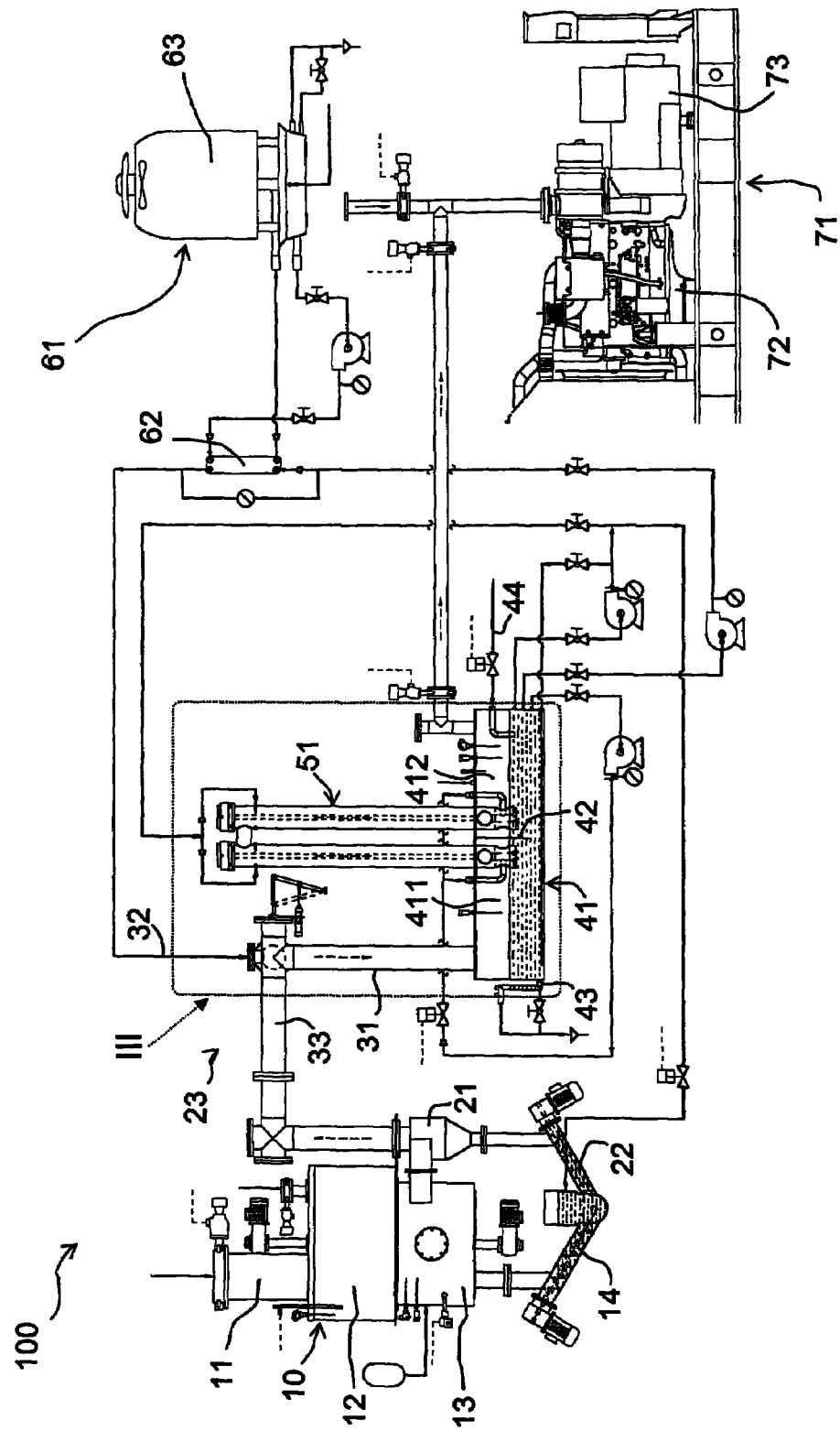
Figure 4:
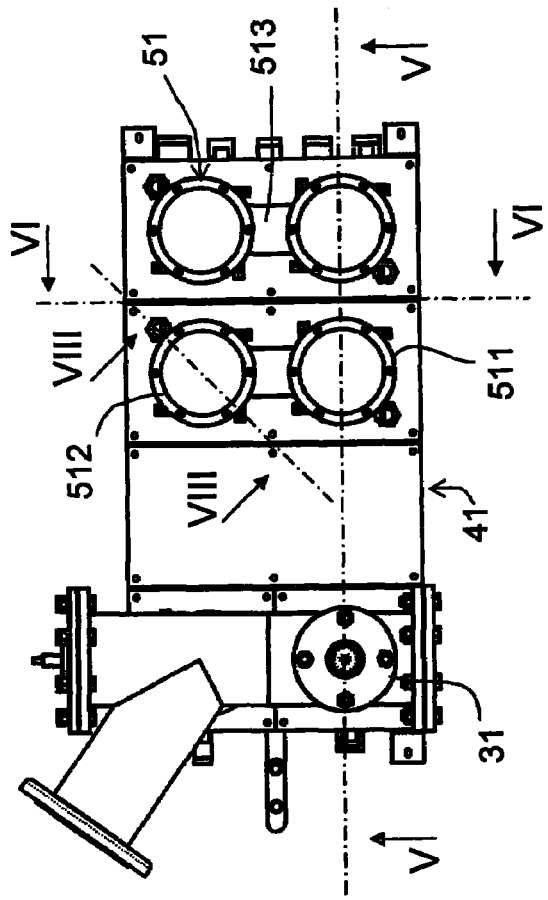
FIG. 4 is a plan view of the filtration apparatus of FIG. 3.
Figure 3:
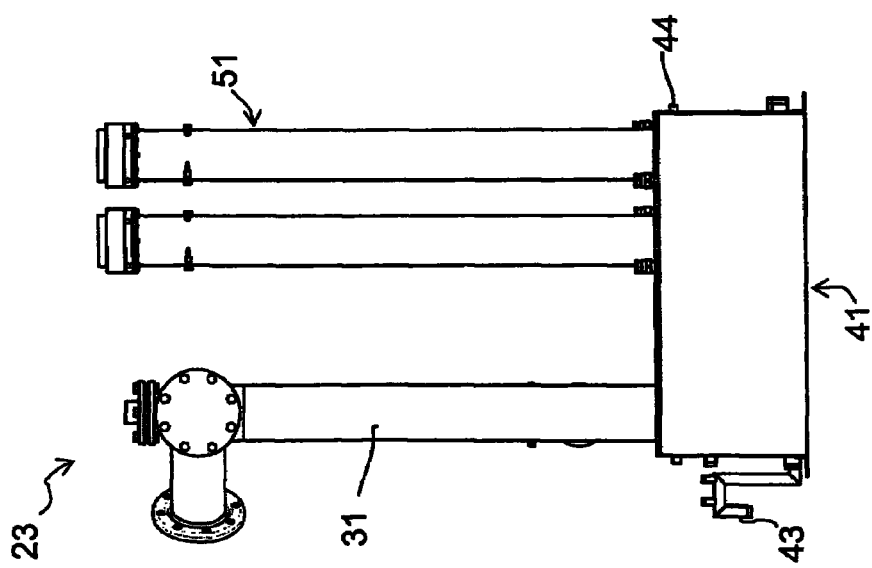
FIG. 3 is a side elevational view of a filtration apparatus similar to that designed with III in FIG. 1.

Reference will be often made herein below to the concepts of "top", "upper" and the like and, respectively, to the concepts of "bottom" "lower" and the like. These concepts are designed to be univocally meant with reference to the plant correctly mounted in working order, therefore subject to the force of gravity.

Reference will further be made to, in the description of the gas pathway, the concepts of "upstream" and "downstream".

By "upstream" it is meant a position relatively near the feed opening of the gasifier, while by "downstream" it is meant a position relatively far from the feed opening.

In the attached figures, with the reference 100 it is generally indicated a gasification plant according to the invention.

The plant 100 comprises a gasifier 10 and an apparatus for the filtration of the gas 23.

The apparatus for the filtration 23 of the gas comprises, in turn, a system 31 for washing and cooling the gas (this system 31 is also called "scrubber"), a tank 41 and at least a filter or wet electrostatic precipitator 51.

Particularly, the scrubber 31 is in fluid communication with the gasifier 10 and it is positioned downstream thereof. The scrubber 31 is in fluid communication also with the tank 41 and it is located upstream thereof. The scrubber 31 is adapted for injecting a washing liquid in the gas flow exiting by the gasifier 10. In the embodiments described below, it is assumed that the washing liquid is water, but in other possible embodiments it could also be lime milk, gas oil, etc.

The tank 41 comprises a bottom area 414 adapted for collecting the washing liquid or water, and a top area 415 closed by a lid 45 and adapted for holding the gas. The tank is therefore adapted for receiving the gas and water by the scrubber 31 and to divide them by gravity.

The Wet ElectroStatic Precipitator 51 (also called WESP, or Wet ElectroStatic filter) is in fluid communication with the tank and it is downstream thereof. Particularly, the wet electrostatic precipitator 51 is in fluid communication with the top area 415 of the tank, so as to receive only the gas held therein.

In accordance with an embodiment, the gasifier 10 comprises a reactor 12 of the type so-called "downdraft", that is in which biomass is fed to the reactor 12 from the top, while the gas is drawn out from the bottom.

In FIG. 2.1 a known reactor of the "downdraft" type is schematically represented. The reactor 12, which operates in a vertical position, comprises in the top side thereof an opening 11 for the biomass (B) and, under some circumstances, for the air (A). Along the reactor the build-up of the biomass occurs and, in sequence, there are a section (P) in which the pyrolysis phenomena take place; a high-temperature oxidation section (O) where the partial combustion of the biomass by means of combustion air (AR) occurs; and a reduction section (R) where the actual gasification reactions take place.

The combustion air (AR) can be introduced in the reactor 12 by means of suitable nozzles opened on the side in the reactor body or directly by the reactor opening 11 in the "open core" designs.

A grate 125 has the task of supporting the biomass in the reactor 12. During the operation of the reactor 12, the gasification gases, ash and charcoal dusts escape from grate 125 to the collecting area 13 in the bottom part of the reactor body 12.

The fuel gas (G) is headed to the filtration apparatus 23, downstream of the gasifier, in which the dedusting, the cooling and the tar removal will take place.

The residual ash and charcoal are collected in a suitable collecting area 13 in the bottom part of the reactor 12 and successively evacuated.

With reference to the attached FIG. 2.2, an embodiment of the gasifier plant according to the invention is described below.

Figure 10:
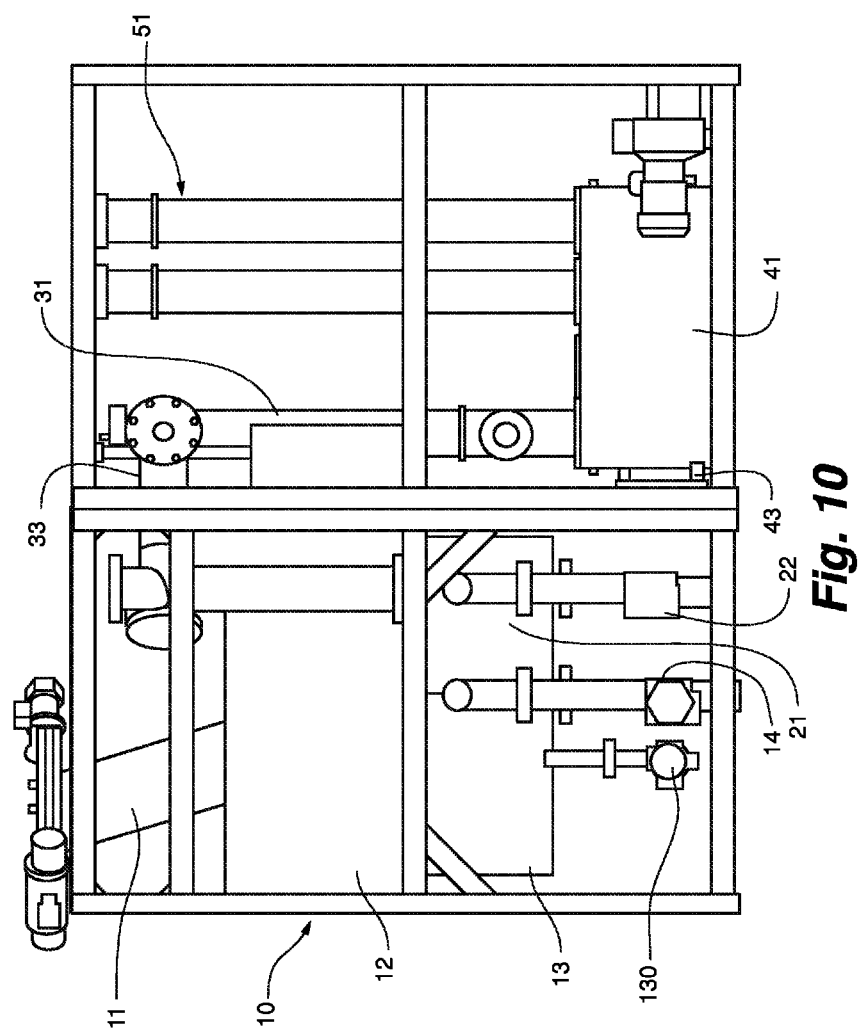
FIG. 10 is a side elevational view of a plant part according to the invention in the whole.
Figure 11:
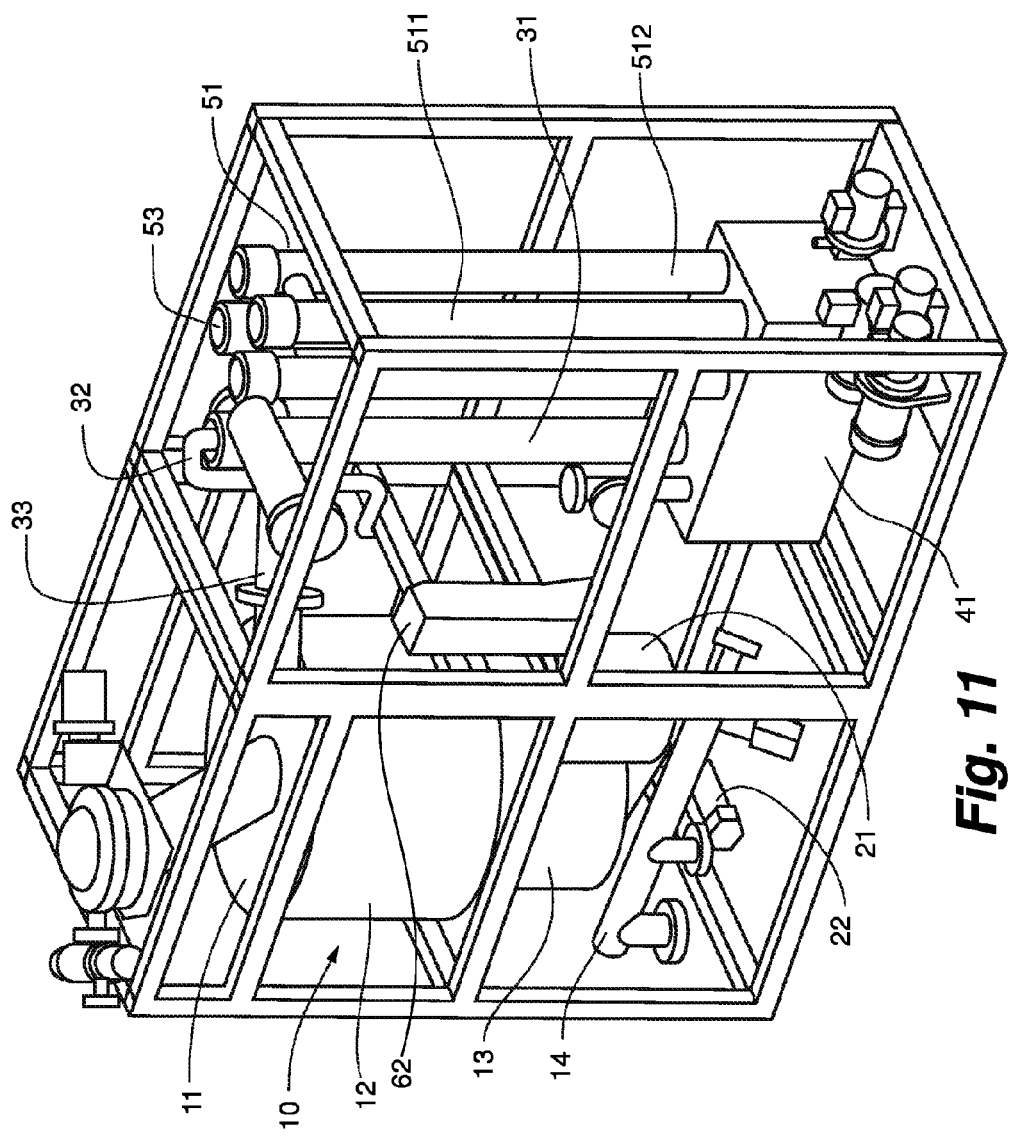
FIG. 11 is a perspective view of the plant part of FIG. 10.
Figure 12:
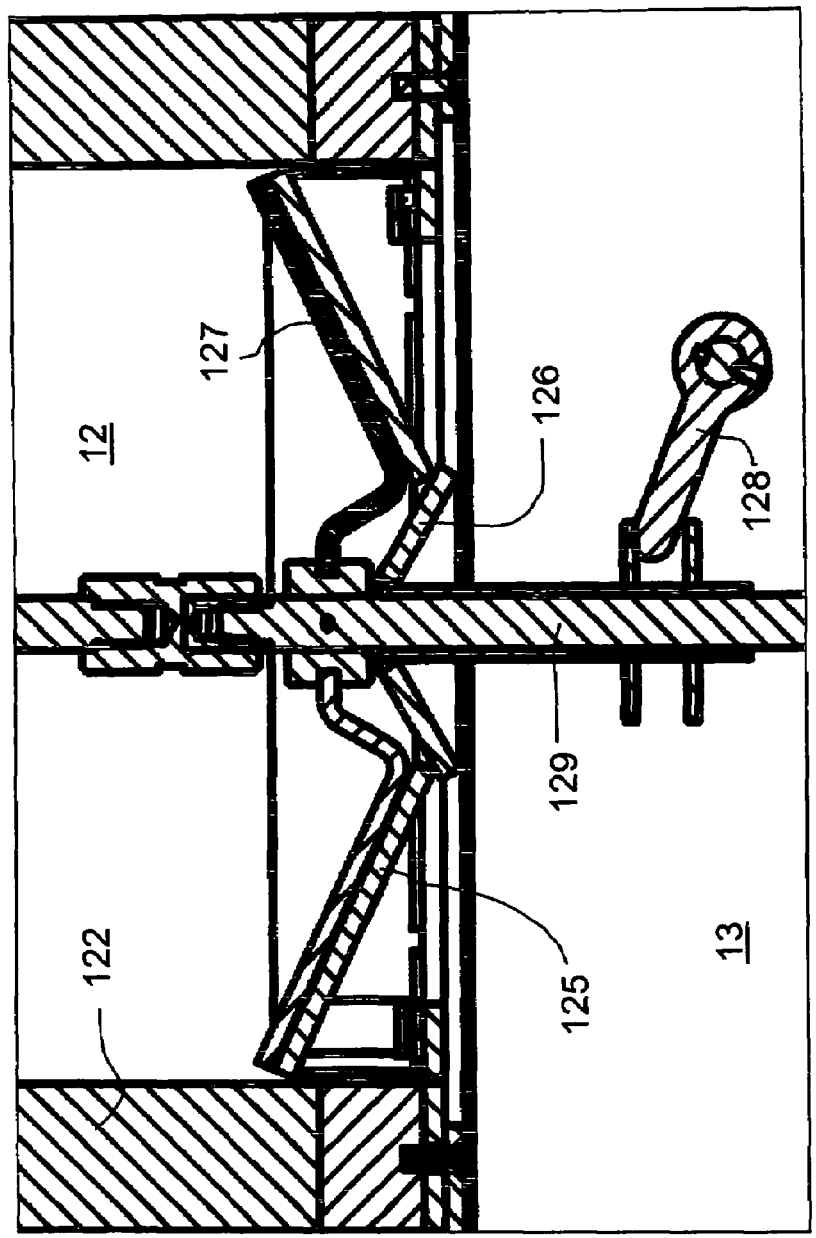
FIG. 12 is a view of the detail designed with XII in FIG. 2.2.

The gasifier 10 comprises a feed opening 11 from which the loading of the biomass is possible; a gasification reactor 12 of a "downdraft" type; a collecting area 13, beneath the reactor 12, where the charcoal is separated by the hot gas; and a screw 14 for the charcoal extraction (shown in FIG. 1, 10, and 11).

In accordance with an embodiment of the invention, the gasifier 10 comprises also an automated evacuation system for foreign bodies. In the biomass available for the feeding of the gasifier 10, foreign bodies are almost always present, such as stones, scrap metals, etc. In order to avoid the build-up of such foreign bodies within the reactor 12, an automated evacuation system of the same foreign bodies has been provided.

The gasifier 10 comprising the evacuation system for the foreign bodies is described below with reference to the annexed FIGS. 2.2 and 12. The gasifier 10 comprises the loading duct 121 to feed gasification reactor 12 with the biomass; the walls 122 of the gasification reactor, made in refractory material; a plurality of layers 123 of insulating material; a shaft 124 provided with horizontal blades 133 for the planar mixing of the biomass within the reactor; a grate 125, preferably frustoconical, for supporting the biomass in the reactor; and a plug 126, preferably conical, for closing the lower part of the frustoconical grate 125.

The particular horizontal configuration of the blades 133 allows for an efficient mixing of the biomass within the single layers, without causing any mixing between adjacent layers.

The frustoconical shape of the grate 125, with a downwards slope facilitates the sliding and building-up of any foreign bodies in the middle part of the grate.

The conical plug 126 is capable to move vertically, thus closing and/or opening the middle part of the frustoconical grate 125. During the normal operation of the reactor 12 the conical plug 126 is in a closing position, while, at preset intervals, it moves in an opening position, allowing for the evacuation of the possibly built-up foreign bodies in the middle of the grate.

The vertical movement is imposed to the conical plug 126 by the lever 128, in turn moved by a suitable servomotor which is periodically activated in order to carry out cleaning cycles.

In accordance with the embodiment represented herein, the gasifier 10 further comprises cleaning blades 127 for the cleaning of the grate 125.

A control on the pressure decrement within the reactor 12 allows establishing when the frustoconical grate 125 starts to clog for the excessive build-up of charcoal and ash dust. In this case the shaft 129 starts to rotate, driven by the gearmotor 130, making the cleaning blades 127 to scrape the frustoconical grate 125. With their rotational movement, the blades 127 drop in the underlying area the ash and the charcoal particles which clog the grate, while aiding the sliding towards the middle of any foreign bodies that may be present in the reactor 12.

In accordance with an embodiment of the gasifier 10, it comprises further blades 131 located in the collecting area 13. Such blades 131 are adapted for conveying the charcoal, ashes and foreign bodies fallen during the cleaning cycles of the frustoconical grate 125 by the blades 127 and during extraction of the foreign bodies due to the opening of the plug 126. The blades 131 are integral with the shaft 129 and rotate with it, conveying the charcoal, ashes and the possible foreign bodies to a duct 132 for their subsequent evacuation.

The gas exiting from the gasification reactor 12 is at a temperature of about 700° C. and carries suspended charcoal and ash dusts, and tar vapours. In order to be made usable (for example for the feeding of an internal combustion engine), it is preferable cooling the gas to temperatures below 50/60° C., dedusting the gas and eliminating the tar fraction which, during the cooling, condensates to form an aerosol.

The plant 100 according to the invention provides, downstream of the gasifier 10, a filtration apparatus 23 comprising a scrubber 31, a tank 41 and a wet electrostatic precipitator 51.

In accordance with the embodiment represented in the annexed figures, the apparatus 23 for the gas filtration is adapted for subjecting the gas to a "wet" treatment process in which the gas is cooled via a water scrubber 31 (in the instant case, a venturi-scrubber) and then filtered from the tar mists and the particles which remain suspended through the use of wet electrostatic precipitators (Wet ESP, or WESP).

In accordance with an embodiment, the apparatus 23 for the filtration of the gas exiting the reactor 12 comprises also a cyclone 21 located upstream the scrubber 31 and adapted for carrying out a first dedusting of the gas.

The cyclone 21 serves for the first dedusting of the gas before the subsequent "wet" cleaning of the latter. The cyclone therefore serves in order to decrease the amount of solids drawn by the gas, and in this way avoid subsequent cleaning and dust build-up problems in the downstream plant sections. The dusty material entrapped by the cyclone 21 is discharged and evacuated by means of a suitable screw 22.

The venturi-scrubber 31 uses water as a cleaning fluid and as a motor fluid for the gas. That means that an injection of pressurized water in the gas flow creates an overpressure adapted for moving the same gas along the plant. The water is headed to the scrubber 31 by a special pressurized duct 32 and it is then injected in the gas flow.

In the venturi-scrubber 31 the hot and dusty gas coming from, through a special duct 33, the reactor 12 or, where present, from the cyclone 21, comes in intimate contact with the motor fluid. Thus, the gas is cooled, partially deprived of the tar which condensates during the cooling process and further dedusted.

At the outlet of the scrubber 31 a unique tank 41 is provided on which also the electrostatic precipitator 51 described herein below is mounted. The tank can be made, for example, of steel, polymeric material, or another material adapted for corrosion resistance by contaminated water.

The water and gas jet exiting from the venturi-scrubber 31 separate by gravity in the tank 41. The water fills the bottom area 414 of the tank 41, while the gas and tar mists occupy the top area 415 of the tank 41.

The gas which separates from the water jet entering the tank 41, coming from the venturi-scrubber 31, may freely occupy the top area 415 of the tank 41 between the water surface and the lid 45. The maximum water level in the tank 41 is ensured by an overflow 43, while the minimum level is ensured by an external water inlet 44 controlled by a proper probe or float.

On the top side of the tank 41, for example on the lid 45, at least one electrostatic precipitator 51 is fixed such that the inlet of the gas to the electrostatic precipitator occurs on the top side of the tank.

The electrostatic precipitator 51 is a "wet" electrostatic precipitator (wet ESP); it comprises at least one circular cross-section tube 511 vertically mounted to the tank 41.

Within the tube 511 an electrode 52 is positioned. It is located in a central position along the axis of the tube and is supported by a plug 53 made of a suitable, electrically insulating material.

In accordance with an embodiment, both an automated cleaning system of the tube inner wall 511, and a middle electrode cleaning system 52 are provided.

In particular, in the top area of each tube, nozzles 54 are provided, which allows injecting water tangentially to the inner circumference of the tube 511, with the following creation of an even film of water on the inner surface of the tube.

The tar and dust particles which, attracted by the electrical field inside the precipitator, are headed towards the wall of the tube 511 are continuously washed by the film of water and drop in the tank 41 beneath.

Furthermore, a nozzle 55 is provided in the bottom part of the tube, located axially with the middle electrode 52 of the precipitator. The nozzle 55 serves to create a strong water jet which, lapping against the external surface of the electrode 52 throughout the length thereof, bottom to top, cleans it from dust and tar particles settled thereon.

The gas found in the top area 415 of the tank 41 may freely flow in the tube 511. Then the gas runs the tube 511, bottom to top, and due to the effect exerted by the electron emission (corona effect) by the electrode 52, it is cleaned of the tar mist and residual solid particles suspended in the gas.

The tube 511 dimensions define the active surface of the precipitator 51, to the effect of which the gas is exposed during the passage. Together with the intensity of the electrical field applied within the precipitator 51, the dimensions of the tube 511 define therefore the filtering power of the precipitator 51. Fixing the flow rate of the gas to be treated, the filtering power of the precipitator 51 defines the end quality of the treated gas.

As far as the tube 511 length is concerned, it must conciliate the needs related to the filtering power of the precipitator 51 with logistic needs of overall dimension restraint. In the view of this, the length of the tube 511 ranges preferably from 1 m to 3 m. In accordance with the embodiment represented in the annexed figures, the tube 511 is about 1.5 m long.

As regards the internal diameter of the tube 511, also subject to logistic needs of overall dimension restraint, it is preferably below 30 cm, even more preferably below 20 cm. Some further considerations are reported below with reference to the intensity of the electrical field.

In accordance with an embodiment, the tank 41 comprises a separation floodgate 42 therein. The floodgate 42 is connected to the lid 45 and to the walls of the tank 41 but it is not connected to the bottom thereof. Thereby, the floodgate 42 only separates the top area 415, occupied by the gas, in two sealed and distinct portions 411 and 412 while the water beneath remains free to flow throughout the tank 41. The gas which separates from the water jet entering the tank 41 coming from the scrubber 31 may freely occupy the top area of the first portion 411 of the tank 41 which is created between the water surface and the lid 45 of the tank 41 to the floodgate 42.

In such an embodiment, the entrance of the gas in the electrostatic precipitator occurs in the first portion 411 of the tank 41, while the outgoing of the same gas from the electrostatic precipitator occurs in the second portion 412 of the tank, which is sealingly separated via the floodgate 42.

In FIG. 5 the apparatus 23 for the filtration of the gas equipped with tank 41, venturi-scrubber 31, floodgate 42, two electrostatic precipitators 51, intakes for the water inlet 44, and overflow 43 can be observed.

In the embodiment of the annexed figures, each "wet" electrostatic precipitator 51 is in the shape of an upside-down "U". The single precipitator 51 consists of two circular cross-section tubes 511 and 512 connected to each other in the top side via a horizontal tube 513. Tubes 511 and 512 are vertically mounted on the tank 41, such that the tube 511 is directly connected to the top area 415 of the first portion of tank 411 and the tube 512 is connected to the top area 415 of the second portion of tank 412.

As described above, inside each tube an electrode 52 is positioned, in a central position along the axis, supported by the plug 53. Furthermore, the cleaning systems for the inner wall of the tube and of the middle electrode are provided.

The gas present in the first portion 411 of the tank 41 may freely flow in the tube 511. Then the gas runs the tube 511 bottom to top and, due to the effect exerted by the electron emission (corona effect) by the electrode 52, it is cleaned of the tar mist and the residual solid particles suspended in the gas.

Once reached the top area of the tube 511, the gas passes in the horizontal connecting tube 513 which connects tube 511 to tube 512. Then the gas, going down the tube 512, finally flows into the second portion 412 of the tank 41.

In FIGS. 5 and 7 a section of an embodiment of the electrostatic precipitator 51 can be seen in detail.

The particular shape of the electrostatic precipitator 51, an upside-down "U", allows doubling the effective length of the precipitator while keeping the overall dimensions limited. In particular, in the illustrated embodiment in which each tube 511 and 512 has a length of about 1.5 m, the upside-down "U" shape allows the provision of an effective length of the precipitator, equal to about 3 m.

In accordance with such an embodiment, the following parts can be observed in particular: tubes 511 and 512; the high-voltage middle electrode 52; the plug 53 for supporting the electrode 52; nozzles 54 for inflowing of the cleaning water of the tube inner wall; the flange 413 for fastening of the precipitator 51 to the tank 41; the nozzle 55 for cleaning of the middle electrode 52; and the adduction tube 552 of pressurized water to the nozzle 55.

In order to achieve the desired filtration effect as a function of the flow rate of the gas to be treated, between the tube 511, 512 and the electrode 52, an electrical field intensity preferably ranging from 1,000 V/cm to 8,000 V/cm has to be provided. In the instant case, most preferably of about 5,000 V/cm.

In the embodiment represented in the annexed figures, the gap between the middle electrode 52 and the inner wall of the tube 511 is of about 6 cm (difference between the inner radius of the tube and the radius of the electrode). Consequently, in order to achieve the desired filtration effect in such an embodiment, between the tube 511, 512 and the electrode 52 there must preferably be a potential differential ranging from 6,000 V to 48,000 V, most preferably of about 30,000.

Such characteristics of the single upside-down "U"-shaped precipitator 51 manage to ensure the efficient treatment of a gas flow rate of 75 m$^3$/h. The pair of precipitators 51 shown in FIGS. 3, 5, 10, and 11 is therefore able to treat 150 m$^3$/h. For higher flow rates, it is possible to add even further precipitators 51, according to a modular approach.

The water sprayed by the nozzles 54 to create the film within the tubes 511 and 512 seeps in the tank 41, after streaming down the inner wall of the tube and collecting the impurities.

In FIG. 8 a section of an embodiment of the nozzle 55 for the cleaning of the middle electrode 52 can be seen in detail.

In accordance with such an embodiment, the following parts can be particularly observed: the middle electrode 52; the flange 413 for the fastening to the tank 41; the wall of the tube 511 of the precipitator 51; the holes 561 and 562 respectively for the passage of the gas and of the water from the tank 41 to the tube 511 and vice versa; the adduction tube 552 of the pressurized water to the nozzle 55; and the nozzle 55.

In this particular embodiment the nozzle 55 is formed by a sleeve 553 and by a cylinder 554 internally fixed to the sleeve 553. In the top side the cylinder 554 has an external diameter equal to the diameter of the electrode 52 to be cleaned. The inner cylinder 554 and the sleeve 553 therefore form a circular crown-shaped nozzle from where a hollow water jet may originate which laps against the external surface of the electrode 52 during the cleaning cycles.

The periodical washing of the electrode 52 causes an instantaneous interruption of the electrostatic precipitator 51 operation.

The water sprayed by the nozzle 55 to clean the electrode 52, after collecting the impurities, seeps in the tank 41.

Figure 9:
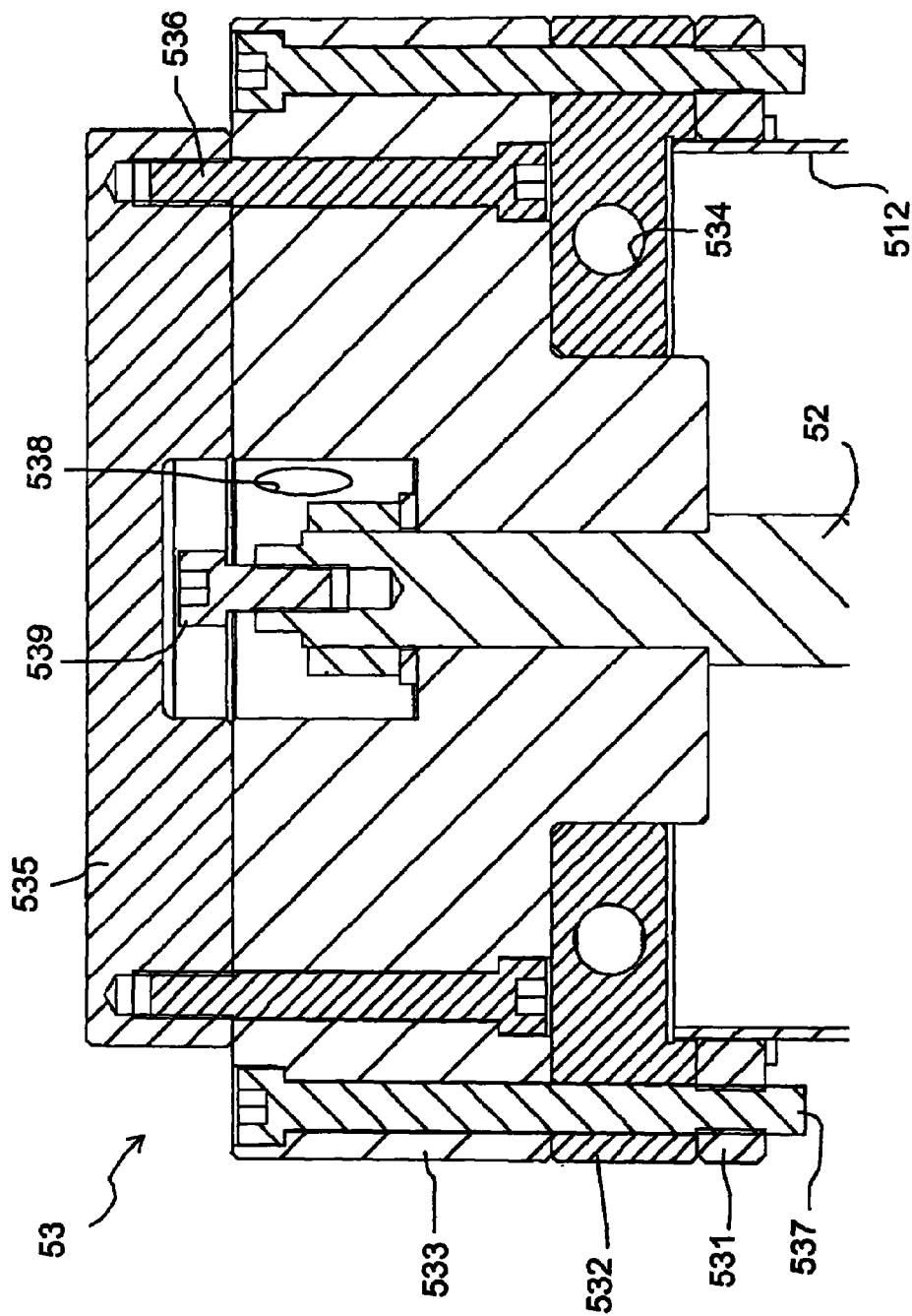
FIG. 9 is a view of the detail designed with IX in FIG. 7.

In FIG. 9 a section of an embodiment of the plug 53 can be seen in detail.

In accordance with such an embodiment, the following parts can be observed in particular: the middle electrode 52; the wall of the tube 512; the fastening flange 531; the first portion of plug 532 fixed to the flange 531; the second portion of plug 533 intended to the supporting and centering of the middle electrode 52; and the third portion of plug 535, integrally fixed to the second portion of plug 533, which covers and electrically insulates the electrode 52 towards its external side.

Particularly, the first portion of plug 532 is made in a material which is insulating and resistant to temperatures above 100° C. It is fixed to the flange 531 via the screws 537.

Housings 534 for heaters are obtained in the first portion of plug 532. Such heaters serve to bring the lower surface of the plug, which is in contact with the water-saturated gas passing through the precipitator, to temperatures above 100° C., such that the above-mentioned surface is kept dry at any time. The dry surface and the use of electrically insulating materials ensure a long-term electrical insulation between the middle electrode 52 and the wall of the precipitator 512, despite the high potential differential.

The middle electrode 52 is firmly kept in place by the nut 539. In the second portion of plug 533 a special radial channel 538 is provided which allows for the connection of the electrode 52 with a high-voltage cable coming from the outside for feeding the electrode.

Furthermore, in the second portion of plug 533 the housings for the screws 536 are provided for fastening the third portion of plug 535, such that, for safety reasons, it cannot be directly disassembled from the outside, but stay solid with the second portion of plug 533.

Figure 13:
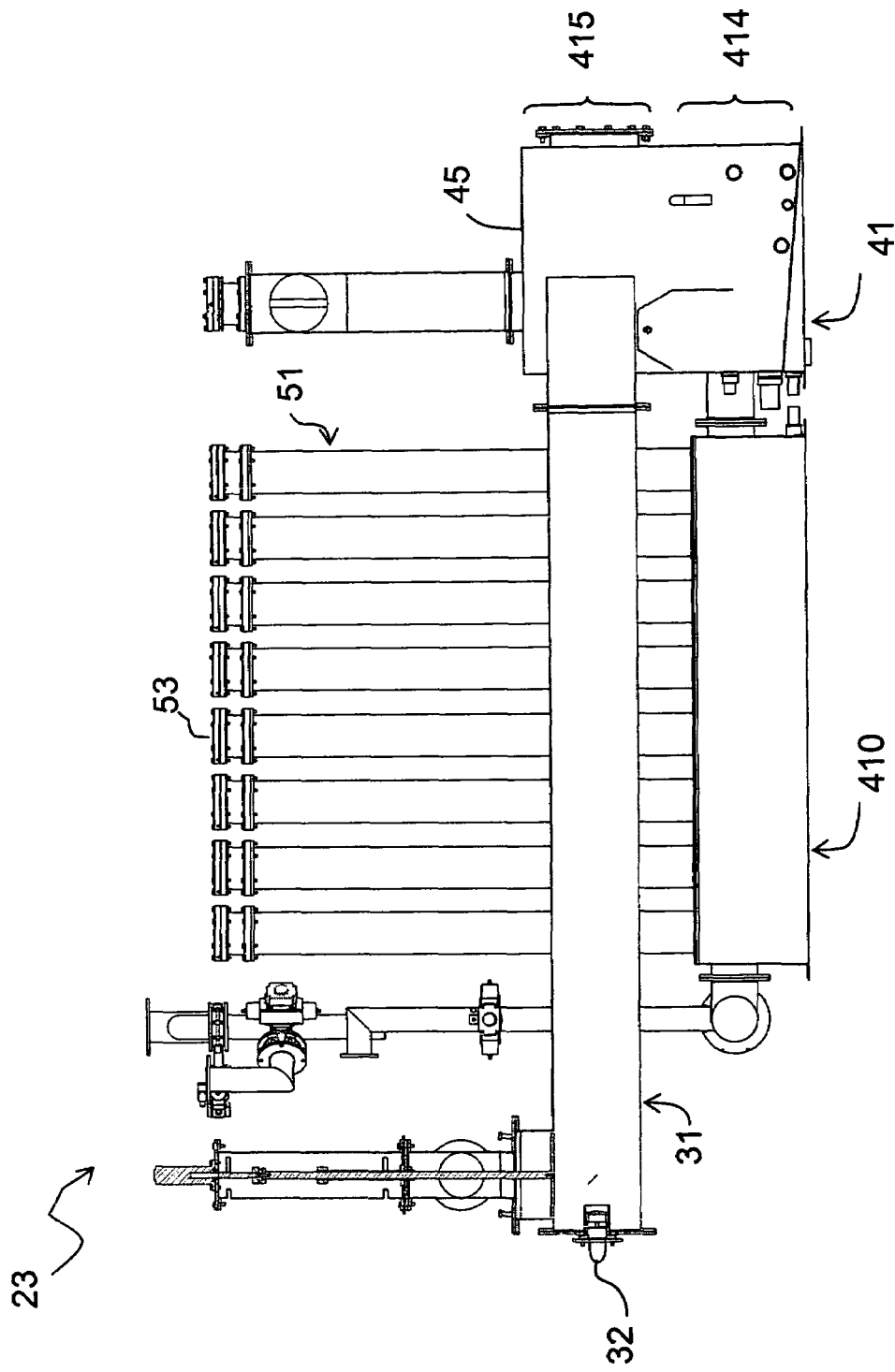
FIG. 13 is a partially sectioned side view of a filtration apparatus similar to that in FIG. 3.
Figure 14:
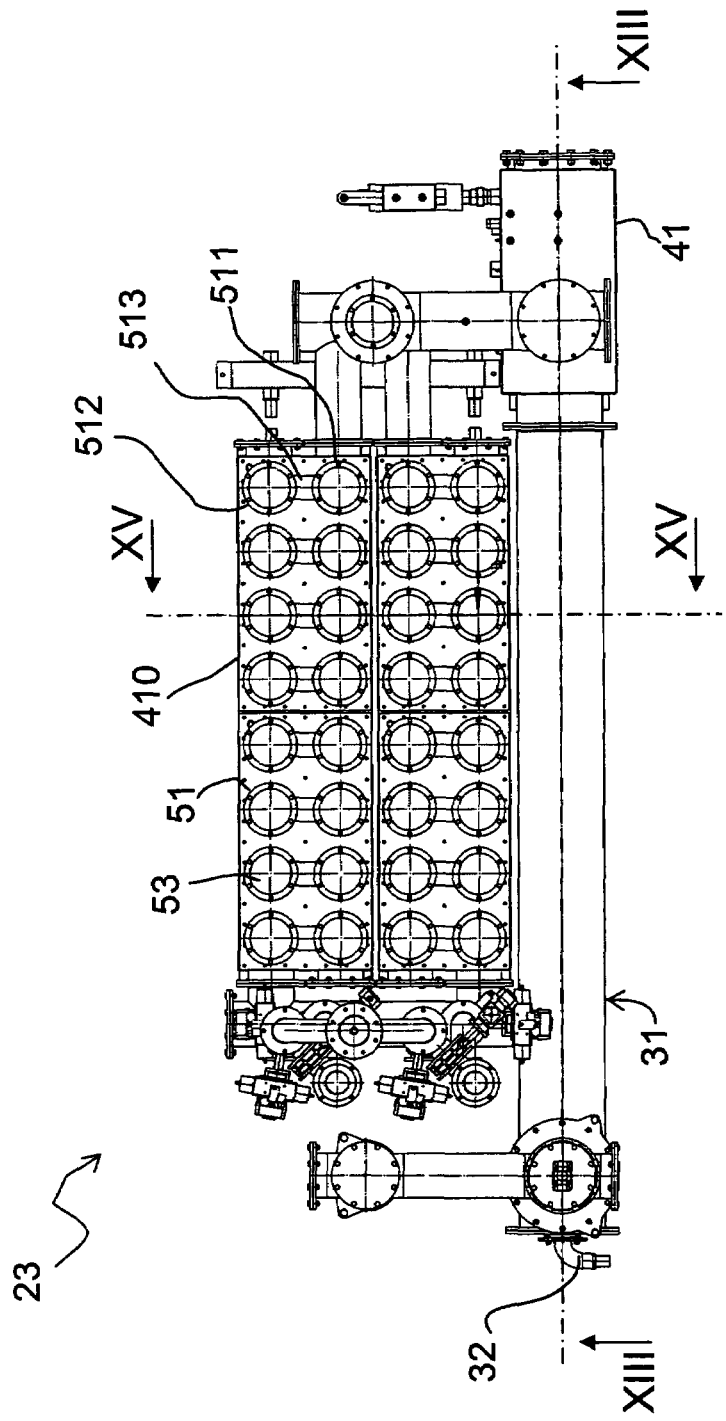
FIG. 14 is a plan view of the filtration apparatus in FIG. 13.
Figure 15:
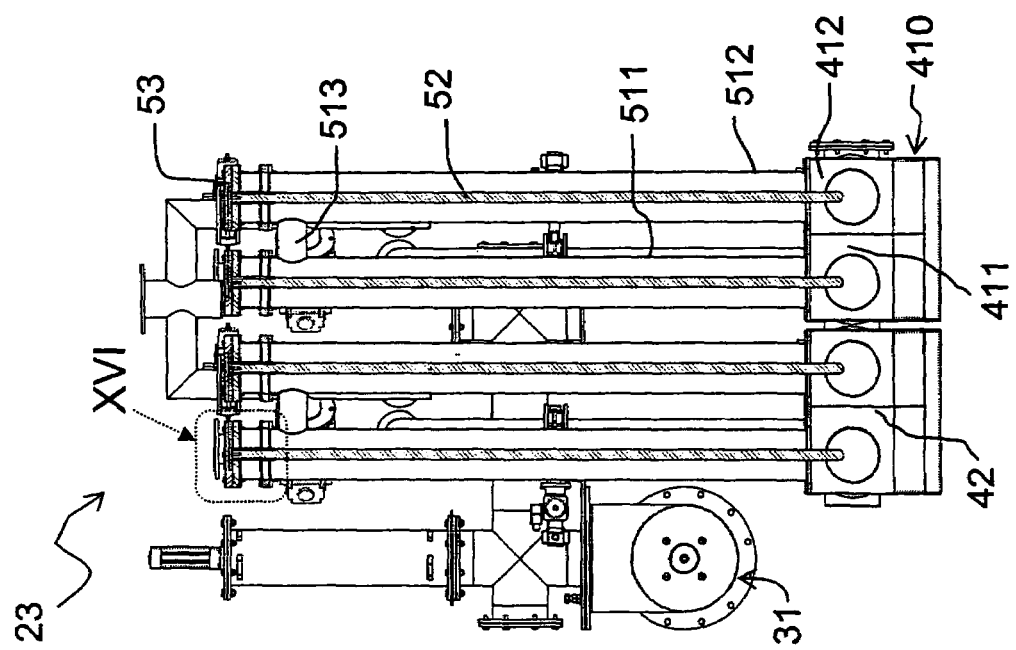
FIG. 15 is a view of the section taken along the line XV-XV in FIG. 14.
Figure 17:
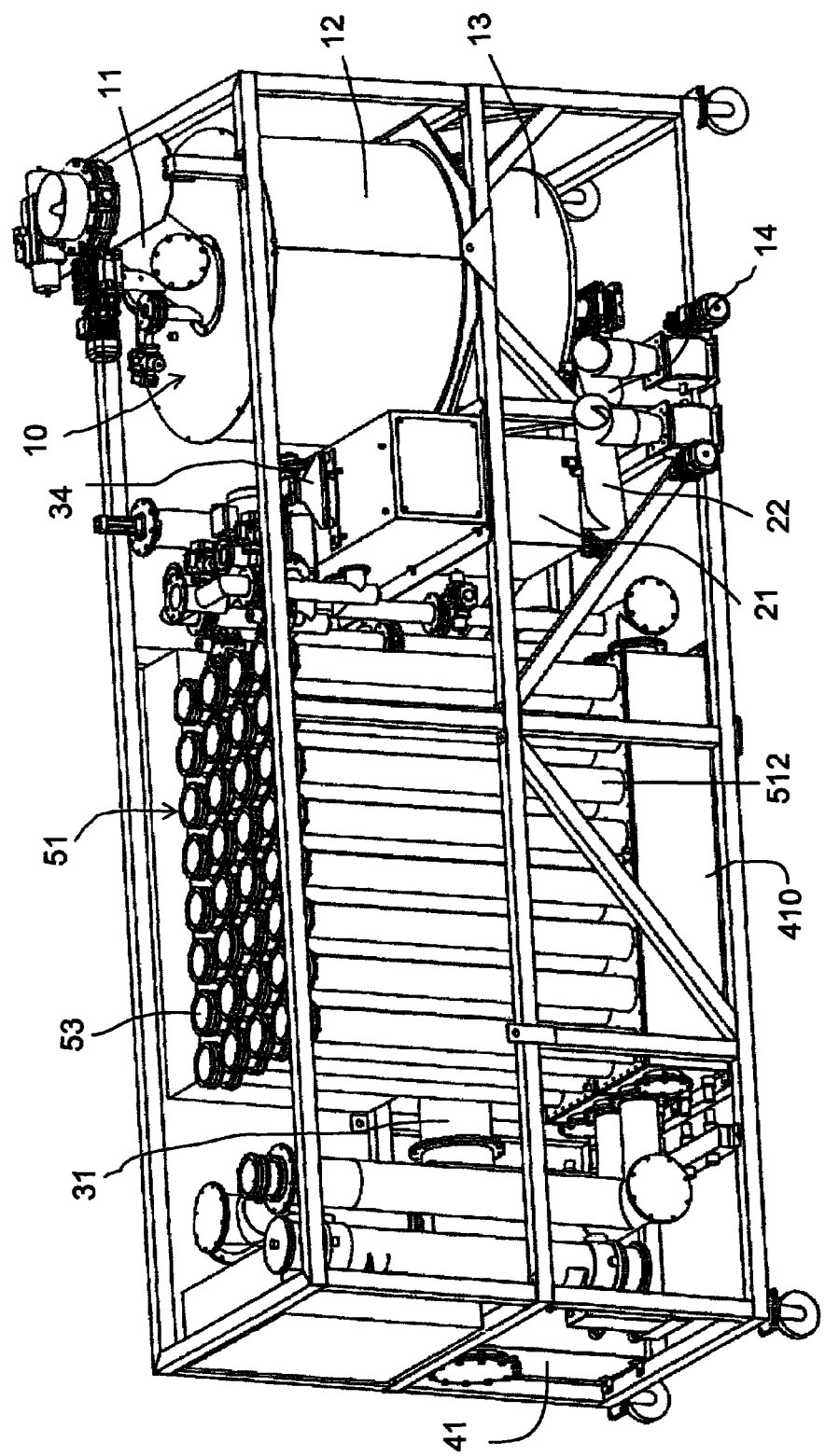
FIG. 17 is an elevational side view of a part of the plant according to the invention as a whole.

FIG. 13 to 15 depict a different embodiment of the gas filtration apparatus 23, while FIG. 17 depicts the assembly of a reactor 12 and a gas filtration apparatus 23 of the type as that in FIG. 13 to 15.

In accordance with this embodiment, the tank 41 that is placed immediately downstream the scrubber 31 does not extend below the electrostatic precipitator 51 while being in fluid communication therewith. Like in the embodiment described above with reference to FIGS. 1, 3-6 and 10-11, the tank 41 collects the washing water and gas exiting the scrubber 31 and separates them by gravity. Particularly, the washing water is collected in the bottom area 414 and the gas is collected in the top area 415. The fluid communication between the top area 415 of the tank 41 and the electrostatic precipitator 51, allows feeding the gas to the electrostatic precipitator 51. On the contrary, unlike in the embodiment described above, the tank 41 in FIG. 13-14 does not collect the washing water dripping from the tubes 511, 512 and electrodes 52 of the electrostatic precipitators 51. In accordance with this embodiment, a bowl 410 is placed beneath the electrostatic precipitators 51. The bowl 410 is connected to the top area 415 of the tank by means of the electrostatic precipitators 51, but it is not connected to the bottom area 414 of the tank 41. Thereby, the water collected in the bottom area 414 of the tank 41 and that collected in the bowl 410 are not admixed with each other.

In accordance with the embodiment in FIG. 13 to 17, the electrostatic precipitator 51 does not comprise any nozzle, either for cleaning the inner wall of tube 511, 512 (like the type of nozzles 54 described above) or for cleaning the middle electrode 52 (like the type of nozzle 55 described above). This lack of nozzles 54 and 55 is particularly seen when FIG. 15 is compared with FIG. 7 described above.

Particularly, in the electrostatic precipitator 51 in FIG. 13 to 17, the water film on the inner surface of the tube (which film is at the basis of contaminant removal in WESPs) is created and autonomously self-supplied. In fact, the gas blowing through the electrostatic precipitator 51 comprises a high amount of water, which is released from the biomass in the form of vapour and microscopic droplets suspended in the gas, or aerosol. Along with the tar and powder particles that are attracted by the electric field, the water aerosol is also conveyed to the walls of tubes 511, 512. The water accumulated on the tube wall forms a film, which is sufficient to catch the tar and powder and drag the latter therewith into the bowl 410 therebelow.

This embodiment which lacks nozzles and cleaning systems for the inner wall of tube 511, 512 and middle electrode 52 results to be easier and more cost-effective than the embodiments described above.

Furthermore, the embodiment in FIG. 13 to 17 uses a mains water amount which is dramatically lower than the embodiment described above, with considerable advantages in terms of environment and ecology. In fact the mains water is used only at the scrubber 31.

In accordance with an embodiment, upon exiting the scrubber 31 the water is taken from the tank 41, cooled by means of a heat exchanger 62 and ricirculated in the scrubber 31.

With this embodiment of the electrostatic precipitator 51, a dense tar is obtained exiting from the bowl 410 which is blended with a small amount of water. The washing water is, indeed, not collected in the bowl 410, unlike in the case described above where the process water was used to wash the walls 511 and electrode 52 of precipitator 51. In this embodiment, the bowl 410 only collects part of the water released from the biomass.

The tar collected in the bowl 410, when it has not been intercepted and sent to other uses (impermeabilization, mulching, hull caulking, anti-moisture treatment for wood, etc.) can be re-fed to the reactor 12. The amount of water that this tar brings therewith is, in fact, quite low, such as to avoid altering the reaction equilibrium. As the tar exiting the filtration apparatus 23 can be re-fed into the reactor 12, a thorough exploitation of the biomass can be obtained and the problem of treating the waste products of plant 100 can be sensibly reduced.

As may be noted, in the embodiment in FIGS. 13 and 14, the filtration apparatus 23 comprises, as compared with the embodiments described above, a greater amount of U-shaped precipitators 51 whereas the scrubber 31 is arranged horizontal rather than vertical.

Due to the greater number of elements 51 as depicted in FIGS. 13, 14 and 17, a greater amount of gas produced from the reactor 12 (seen in FIG. 17) can be treated. This reactor has, in fact, a greater size than the reactor 12 described above with reference to FIGS. 10 and 11.

In accordance with the modular approach as described above, the 16 reversed-U shaped precipitators 51 can ensure effective treatment of max 1200 m³/h flow rate, against 150 m³/h flow rate at which the filtering apparatus in FIGS. 1, 3-6 and 10-11 is designed.

From a functional point of view, the horizontal arrangement of the scrubber 31 (as illustrated in FIG. 13-14) is entirely equivalent to the vertical one (as illustrated in FIGS. 1, 3-5 and 10-11). This horizontal configuration can bring about, in several embodiments, a number of logistic advantages. For example, it can imply a reduction in the plant overall size and/or the achievement of a more linear pathway for the gas to be treated.

In accordance with several embodiments of the plant 100 (for example the one in FIGS. 1, 10 and 11), the gas is moved along the plant (from exiting the reactor 12 to the gas utilization unit 71) is simply obtained by the over-pressure generated by the venturi-scrubber 31, as described above.

In accordance with other more complex embodiments (for example that in FIGS. 13 and 14), the movement of the gas along the plant is obtained by means of suitable blowers 34 that can be controlled such as to ensure an optimum operation of the plant 100 and to meet the requirements of the gas utilization unit 71.

Figure 16:
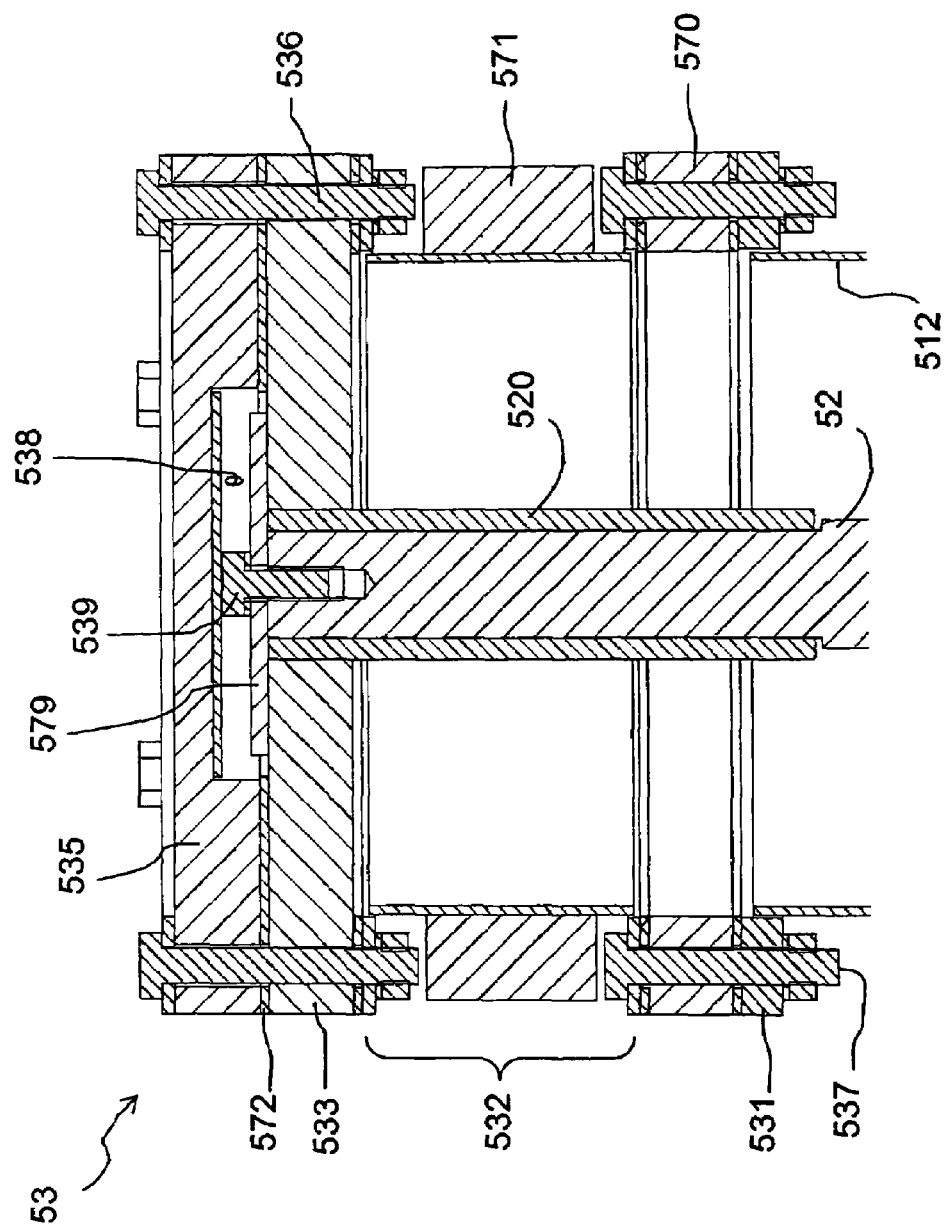
FIG. 16 is a view of the detail designed with XVI in FIG. 15.

In FIG. 16, a section of an embodiment of the plug 53 can be seen, which is different from that described above with reference to FIG. 9.

In accordance with this embodiment, particularly, the following parts can be seen: the middle electrode 52; the sheath 520 covering the upper part of the middle electrode 52; the wall of tube 512; the fastening flange 531 integral with the wall of tube 512; the first portion of plug 532 fixed to the flange 531; the gasket 570 interposed between the fastening flange 531 and the first portion of plug 532 to obtain a suitable heat insulation; the second portion of plug 533 arranged for supporting and centering the middle electrode 52; and the third portion of plug 535, which is firmly fixed to the second portion of plug 533, which covers and electrically insulates the electrode 52 from the outside.

Particularly, the gasket 570 is made of a thermally insulating material resisting to temperature higher than 200° C. The material of which the gasket 570 is made is also required to have such mechanical characteristics as to ensure the structural continuity between the wall of tube 512 and plug 53. In view of what has been stated above, the gasket 570 can be made of, for example, mecanite (a mica-based multi-layer material) or ceramics.

The first portion of plug 532 is made of steel and comprises a section similar to the tube 512 provided with fixing flanges at both ends thereof. The first portion of plug 532 is fixed to the flange 531 by means of the screws 537 and is thus in electric contact with the wall of tube 512.

About the first portion of plug 532 heaters 571 are arranged, which comprise for example electric resistances. These heaters 571 have the function of bringing, by exploiting the principle of radiation, the inner surface of plug 53, which is in contact with the water-saturated gas passing through the precipitator, to temperatures higher than 100° C. such that said surface remains dry at any time.

The middle electrode 52 is firmly hold in position by the nut 539 and respective plate 579 and is insulated in the upper length thereof by the sheath 520. The sheath 520 is made of an electrically insulating material resisting to the high operating temperature of the plug 53. The sheath 520 can be, for example, made of ceramics or mecanite.

The dry surface within the plug 53, the use of electrically insulating materials (mecanite or ceramics) and the covering of the upper length of the electrode 52 ensure the electric insulation between the middle electrode 52 and the wall of precipitator 512 and/or first portion of plug 532 over time, despite the high difference of potential.

The second portion of plug 533 and the third portion of plug 535 are fixed to each other and to the first portion of plug 532 by means of the screws 536. The second portion of plug 533 and the third portion of plug 535 are also made of an insulating material, both from an electric point of view and from a thermal point of view. They can be advantageously made of ceramics or mecanite.

In the third portion of plug 535, a suitable radial channel 538 is provided, which allows the electrode 52 to be connected with a high voltage wire from the outside in order to supply the electrode.

A flat gasket 572 is interposed between the second and third portions of plug, which avoids the provision of clear gaps that may give rise to an electric arc between the energized components (the nut 539 and respective plate 579) and the outside.

In accordance with some possible embodiments, the plant 100 comprises a circuit 61 for the cooling of the water which is gradually collected in the tank 41.

In accordance with the embodiment of the plant 100 represented in FIG. 1, the cooling circuit 61 comprises a heat exchanger 62 and a cooling tower 63.

In accordance with some possible embodiments, the plant 100 finally comprises a gas utilization unit 71.

In accordance with the embodiment of the plant 100 as represented in FIG. 1, the gas utilization unit 71 comprises an internal combustion engine 72 and a generator 73 for the production of electrical power. Particularly, it is suitably observed that the excellent quality of the gas exiting the plant 100 according to the invention allows for the feeding of the current reciprocating engines (both with Otto cycle and Diesel cycle) and/or of gas turbine engines.

In accordance with other possible embodiments, the gas utilization unit 71 may comprise: burners and/or boilers for the heating and/or for the production of sanitary hot water; manifolds for the conveying of the gas in a distribution system; blowers for the storage of gas in cylinders or tanks; gas filtration units via molecular membranes or filters for the fractioning of the producer gas into the single gases which compose it ($H_2$, CO, $N_2$, etc.); units for the production of liquid fuels via catalytic processes such as the Fischer-Tropsch process; and any other type of gas utilization unit 71 known per se.

From what stated above, it will be understood by those skilled in the art how the plant 100 and the gasifier 10 according to the invention overcome the drawbacks observed in relation to the prior art.

In particular, it will be understood by those skilled in the art how the apparatus 23 for the filtration of the gas is extremely compact, efficient and how its realization is inexpensive.

Furthermore, it will be understood by those skilled in the art that the gasifier 10 can ensure a continuous working without having to stop the operation for the removal of the foreign bodies.

It is understood that the specific characteristics are described in relation to the different embodiments of the plant 100, with the aim to be exemplificative, but not limitative.

It is understood that to the plant 100 and the gasifier 10 according to the present invention, those of ordinary skill in the art, aiming at meeting contingent and specific requirements, will be able to make further modifications and variations, all of them falling within the scope of protection of the invention, as defined by the following claims.

The invention claimed is:

1. A plant for the gasification of biomass, comprising a gasifier and an apparatus for the filtration of the gas comprising a scrubber, a tank and a wet electrostatic precipitator, wherein:

the gasifier comprises a downdraft, open core gasification reactor in which an opening for an inlet of the biomass is adapted also for the inlet of air;

the scrubber is in fluid communication with the gasifier and with the tank and is adapted for the injection of a washing liquid in the gas flow exiting said gasifier;

the tank comprises a bottom area adapted for collecting the washing liquid and a top area adapted for holding the gas, the tank being thus adapted for receiving the gas and the washing liquid and to separate them by gravity, the tank further comprising an overflow and an inlet for external water controlled by a proper probe or float, which are adapted to ensure respectively the maximum level and the minimum level of the water in the tank; and the wet electrostatic precipitator is in fluid communication with the top area of said tank such as to receive only said gas.

2. The plant according to claim 1, in which said washing liquid is water.

3. The plant according to claim 1, wherein said reactor sequentially comprises a section in which the pyrolysis phenomena of the biomass occur; a high-temperature oxidation section where the partial combustion of the biomass by means of combustion air occurs; and a reduction section where the gasification reactions of the biomass Occur.

4. The plant according to claim 1, wherein said gasifier comprises a shaft provided with horizontal blades for the planar mixing of the biomass.

5. The plant according to claim 1, wherein the filtration apparatus comprises also a cyclone upstream of said scrubber.

6. The plant according to claim 1, wherein the filtration apparatus is adapted for cooling the gas from about 700° C. to between about 50° C. and 60° C.

7. The plant according to claim 1, wherein said wet electrostatic precipitator comprises at least one circular cross-section tube and an electrode located in a central position along the axis of the tube.

8. The plant according to claim 1, wherein said tank comprises a floodgate therein, connected to a lid and a wall but not to a bottom of the tank, so as to separate the top area in a first portion and in a second portion, said portions being distinct and sealed, while the bottom area of the tank remains not divided.

9. The plant according to claim 1, wherein the electrostatic precipitator is shaped as an upside-down "U", comprising at least one first vertical tube and at least one second vertical tube which are connected to each other in the top area via a horizontal tube.

10. The plant according to claim 1, further comprising, downstream of said apparatus for the filtration of the gas, a gas utilization unit comprising an internal combustion engine selected from the group consisting of: Otto cycle reciprocating engines; Diesel cycle reciprocating engines; and gas turbine engines.

11. The plant according to claim 1, further comprising a gas utilization unit selected from the group consisting of: burners and/or boilers for the heating and/or for the production of sanitary hot water; manifolds for the conveying of gas in a distribution system; blowers for the storage of gas in cylinders or tanks; membrane filtering units and/or molecular filters for fractionating the producer gas; and units for the production of liquid fuels.

12. The plant according to claim 1, further comprising a circuit for cooling water collected in the tank.

13. The plant according to claim 1 further comprising a bowl being arranged below the electrostatic filter, wherein the bowl is connected to the top area of the tank by means of the electrostatic precipitator but is not connected to the bottom area of the tank, such that the liquid collected within the bottom area of the tank and that collected within the bowl are not admixed with each other.

14. The plant according to claim 1, wherein upon exiting the scrubber the washing liquid is taken from the tank, cooled by means of a heat exchanger and recirculated in the scrubber.

15. The plant according to claim 1 comprising at least one blower suitable for moving the gas along the plant, the blower being capable of being controlled such as to ensure the optimum operation of the plant.

16. A plant for the gasification of biomass, comprising a gasifier and an apparatus for the filtration of the gas comprising a scrubber, a tank and a wet electrostatic precipitator, wherein:
   the gasifier comprises a downdraft, open core gasification reactor in which an opening for an inlet of the biomass is adapted also for the inlet of air;
   the scrubber is in fluid communication with the gasifier and with the tank and is adapted for the injection of a washing liquid in the gas flow exiting said gasifier;
   the tank comprises a bottom area adapted for collecting the washing liquid and a top area adapted for holding the gas, the tank being thus adapted for receiving the gas and the washing liquid and to separate them by gravity, the tank further comprising a floodgate therein, connected to a lid and a wall but not to a bottom of the tank, so as to separate the top area in a first portion and in a second portion, said portions being distinct and sealed, while the bottom area of the tank remains not divided; and
   the wet electrostatic precipitator is in fluid communication with the top area of said tank such as to receive only said gas.

17. The plant according to claim 16, in which said washing liquid is water.

18. The plant according to claim 16, wherein said reactor sequentially comprises a section in which the pyrolysis phenomena of the biomass occur; a high-temperature oxidation section where the partial combustion of the biomass by means of combustion air occurs; and a reduction section where the gasification reactions of the biomass occur.

19. The plant according to claim 16, wherein said gasifier comprises a shaft provided with horizontal blades for the planar mixing of the biomass.

20. The plant according to claim 16, wherein the filtration apparatus comprises also a cyclone upstream of said scrubber.

21. The plant according to claim 16, wherein the filtration apparatus is adapted for cooling the gas from about 700° C. to between about 50° C. and 60° C.

22. The plant according to claim 16, wherein said tank comprises an overflow and an inlet for external water controlled by a proper probe or float, which are adapted to ensure respectively the maximum level and the minimum level of the water in the tank.

23. The plant according to claim 16, wherein said wet electrostatic precipitator comprises at least one circular cross-section tube and an electrode located in a central position along the axis of the tube.

24. The plant according to claim 16, wherein the electrostatic precipitator is shaped as an upside-down "U", comprising at least one first vertical tube and at least one second vertical tube which are connected to each other in the top area via a horizontal tube.

25. The plant according to claim 16, further comprising, downstream of said apparatus for the filtration of the gas, a gas utilization unit comprising an internal combustion engine selected from the group consisting of: Otto cycle reciprocating engines; Diesel cycle reciprocating engines; and gas turbine engines.

26. The plant according to claim 16, further comprising a gas utilization unit selected from the group consisting of: burners and/or boilers for the heating and/or for the production of sanitary hot water; manifolds for the conveying of gas in a distribution system; blowers for the storage of gas in cylinders or tanks; membrane filtering units and/or molecular filters for fractionating the producer gas; and units for the production of liquid fuels.

27. The plant according to claim 16, further comprising a circuit for cooling water collected in the tank.

28. The plant according to claim 16 further comprising a bowl being arranged below the electrostatic filter, wherein the bowl is connected to the top area of the tank by means of the electrostatic precipitator but is not connected to the bottom area of the tank, such that the liquid collected within the bottom area of the tank and that collected within the bowl are not admixed with each other.

29. The plant according to claim 16, wherein upon exiting the scrubber the washing liquid is taken from the tank, cooled by means of a heat exchanger and recirculated in the scrubber.

30. The plant according to claim 16 comprising at least one blower suitable for moving the gas along the plant, the blower being capable of being controlled such as to ensure the optimum operation of the plant.

\* \* \* \* \*